Oct. 19, 1926.
F. G. BENNETT
1,603,934
VEHICLE
Filed Dec. 15, 1924     2 Sheets-Sheet 1
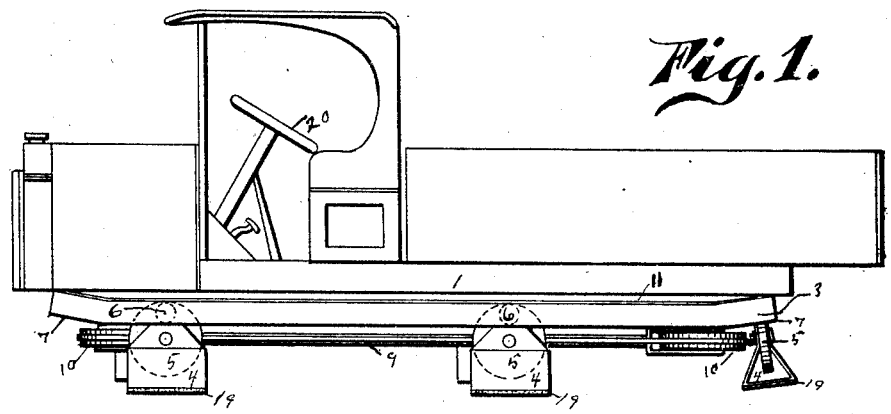
Fig.1.
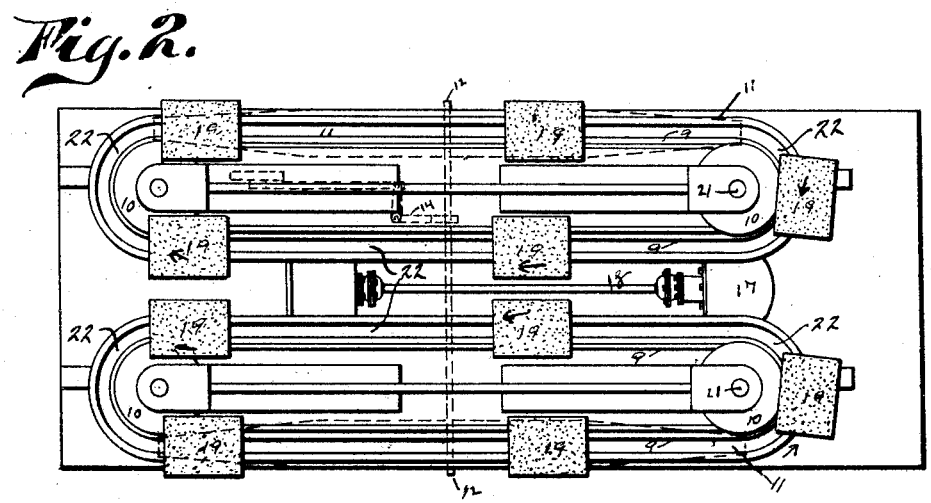
Fig.2.
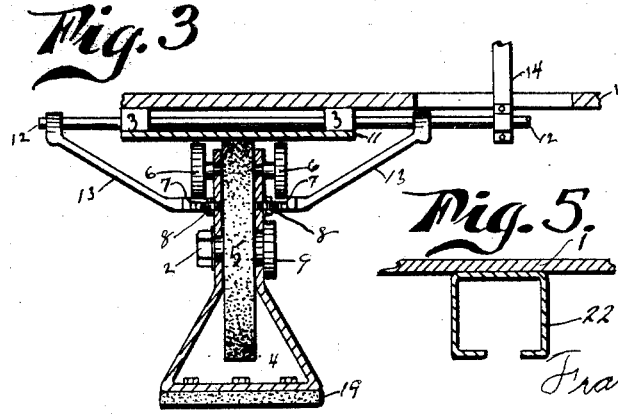
Fig.3
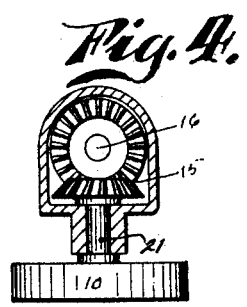
Fig.4.
Fig.5.
INVENTOR
Frank George Bennett Oct. 19, 1926. 1,603,934
F. G. BENNETT
VEHICLE
Filed Dec. 15. 1924    2 Sheets-Sheet 2

INVENTOR,
Frank George Bennett,
BY F. E. Maynard.
ATTORNEY.

Patented Oct. 19, 1926.

1,603,934

UNITED STATES PATENT OFFICE.

FRANK GEORGE BENNETT, OF LOS ANGELES, CALIFORNIA.

VEHICLE.

Application filed December 15, 1924. Serial No. 755,963.

The invention relates to supporting apparatus for vehicles and has for its broad object to eliminate round traction wheels and also avoid the use of cumbersome, power consuming, so called "endless track platforms" of the type which includes a series of broad, hingedly connected tread plates carried by a driving belt in an orbit in a vertical plane and in which each heavy tread plate is completely inverted in an epicycloidal traverse.

An object of the invention is to provide for a material reduction in weight and in power consumption over the vertical-orbit platform device, and to provide for the operation of feet-means in a nearly horizontal orbit and to bring a series of the feet down to ground engaging position while others are raised and carried backward or forward to new effective positions on the ground, all without necessitating an inversion of any part of the foot means.

Another object is to provide a multifoot, endless carrier disposed in a generally horizontal plane and to provide means for glidingly transmitting the load of the vehicle to a plurality of its feet while other feet are in a raised, ineffective position and are being carried forward or rearward in a horizontal path and out of ground contact.

A further object is to provide for a sufficient number of ground engaging feet at any instant to cause the vehicle to glide along smoothly irrespective of the fact that one of the feet may have been brought down over a low spot in the roadway.

Another object is to provide for the material lowering of the center of gravity of the vehicle, and to provide a low-down truck bed in such class of vehicles.

Figure 1 is a side elevation of a truck incorporating the driving apparatus.

Figure 2 is a bottom plan.

Figure 3 is a cross-section of a portion of the truck bed and a lowered, effective foot.

Figure 4 is a detail of a horizontal, belt driving wheel and its gearing.

Figure 5 is a cross-section of the foot elevating track.

Figure 6:
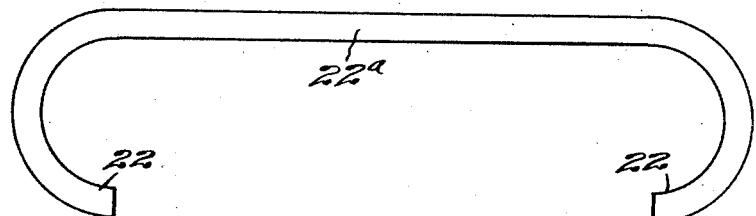

Figure 6 is a plan of the foot elevating channel-track.

Figure 7:
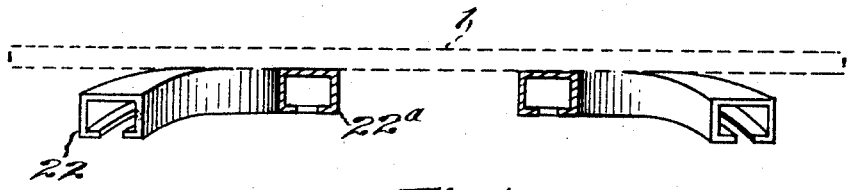

Figure 7 is a cross-section and end view of one channel track.

Figure 8:
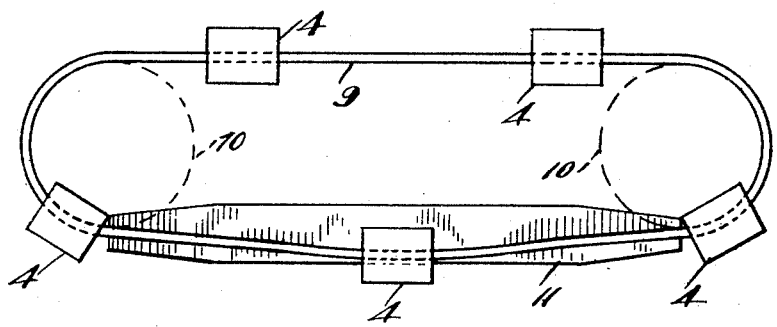

Figure 8 is a diagram of a turning position of feet.

A truck is shown as having a bottom 1 and frame members 3 thereunder. Along each side of the bottom 1 there is secured to frame 3 a stout metal strip or plate 11 having plane, elongated, runway faces whose ends are shown in Fig. 1 as sloping up toward the bottom 1. These strips form soles against which bear rollers 5 mounted on axles 2 in boxes 4, here called feet, since their function is to engage and stand upon a roadway surface while the body of the vehicle is moving forward or rearward as the case may be. The bottom of the feet members 4 are provided with removable rubber or metal treads 19.

Means are provided for raising the feet 4 successively as they are approached by the ends of the fixed soles 11 and for causing the feet to swing around in an elongated, horizontal orbit having straight runway stretches and then be depressed to a supporting position between the soles 11 and the road surface.

Means are also provided for curving the lines of application of the feet taking a supporting position so as to guide the vehicle in a turning motion.

At the ends of the fixed soles 11 there commence semicircular, inverted channel guides 22 having entrance ends sloping upwardly as in Fig. 1, to conform to the up slope of the ends of the soles 11. The end turns of of the channel tracks 22 lie up against the bottom 1 and are therefore higher than the bottom plane of the soles 11. The inner ends of coordinate channel turns are connected by straight runway portions 22ª.

At each side of the top of each foot 4 is a lift or cam wheel 6 arranged to run onto and along the inturned cam-forming flanges of the channel tracks 22.

There is one of the cam or channel tracks 22—22ª at each side of the bottom 1 and in the bends of the tracks are centered front idler and rear drive wheels 10, the latter having shafts 21 with gears 15 driven by shaft 16 in a differential gear case 17 from which runs the usual drive or propeller shaft 18.

Passing around the respective front and rear wheels 10 is a strong, endless carrier or belt 9 which lies as a whole flatwise under the vehicle body, and at even points along the belt 9 are the outwardly attached feet 4.

The drive wheels 10 drive the belts 9 so that their outer stretches run unidirectionally. Reversing rotation of the propeller shaft 18 reverses travel of the belts of the vehicle.

From the above it will be seen that as the belts travel in their orbits those feet 4 which leave the outside turn of the channel tracks 22 pass down under the slope of the elongated, plane soles 11 and these run onto the tops of the rollers 5 as the tread 19 of the feet bear down upon the roadway.

As above stated, the outer turns of the channel tracks 22 terminate at about the ends of the soles 11, which are about radially opposite to the shafts 21. The soles are widened for a purpose now to be explained.

The outer stretches of the belt loops are designed to be flexed laterally in or out so as to effect the placing down of the outer feet 4 in a curved line under the vehicle. This is to enable steering in curved paths. The soles are wide enough to engage the load rollers 5 in their lateral change of position.

Means to flex the foot carriers as desired, laterally and concurrently, one inward and one outward, as shown diagrammatically in Fig. 8, here comprises a pair of spaced, spring, side cam-forming tracks 7 (Fig. 3) attached suitably to the ends of respective channel tracks 22. Midway their lengths, the tracks 7 are secured to braces 13 which are fixed on a cross bar 12 which is moved endwise by a bell-crank 14 connected to an ordinary steering worm and wheel 20. Antifriction rollers 8 run along the inner faces of the cam tracks 7 and pass from these to the inner edges of the flanges of the channel tracks 22. The curvature of the side tracks 7 determines curvilinear placement of the feet 4 as they come down the slopes of the soles 11 and of the ends of the track bends 22.

It is preferred that there be two or more feet 4 in supporting position with each sole 11 at all times so that if one is over a road depression another on the same side is taking the load. This will cause the vehicle to glide easily and smoothly along on a stationary set of feet whose rollers 5 are engaging the soles 11.

The invention claimed is:

1. A wheel-less vehicle having driving belts lying in a generally common plane and forming straight outer side stretches, means for driving the belts in their orbits, elongated sole plates along the outer side stretches of the belts. foot means for carrying the whole load of the vehicle, attached to said belts to be carried thereby in an elongated orbit and into load taking position beneath said sole plates, and orbit tracks for carrying the foot means in an elevated, ineffective position and for lowering them to and raising them from effective position under the sole plates.

2. A wheel-less vehicle having a set of elongated, straight runway tracks, elongated orbintal guide tracks leading downward and upward at respective ends of the runway track, endless, driven belts coordinate to said tracks and having, each, a plurality of foot members movable into position vertically below the runway tracks to take the whole load of the vehicle; said runway tracks gliding along the depressed foot members.

3. A vehicle having means providing elongated, plane gliding surfaces, foot-forming means movable in horizontal orbits and onto which said elongated surfaces pass after the foot means come to rest upon the roadway, and means for effecting a relative curvature of position of the foot means as they come into supporting effect so as to turn the vehicle.

4. A belt driven vehicle including a generally horizontal, driven belt carrying a series of upright foot devices to take the whole load of the vehicle, a load imposing, straight, runway track, and an orbital guide and lift track leading up at the ends of the runway track; said foot devices having, each at its top, rollers cooperative with said runway track and said lift track, whereby to take the load for a period and then be lifted by the lift tracks to an ineffective position.

5. A vehicle having a set of straight, side runway tracks and orbital lift tracks having parts bending downward to the ends of the respective runway tracks, and means for carrying the whole load of the vehicle and including sets of foot devices connected by driving belts so as to be positioned vertically under the runways; said devices including members having load receiving rollers to run on the runway tracks and lifting rollers to follow the orbital, lift tracks to elevate said devices.

6. Apparatus for supporting and propelling a vehicle, including endless sets of foot members, said members sweeping in generally horizontal orbits having elongated, straight stretches, means for successively raising and lowering the members at the ends of said stretches during traverse of their orbits, and means for varying the point of application of the foot members to the roadway, whereby to effect a turning of the vehicle.

7. Propelling means for a vehicle, comprising, in combination, endless carriers, means for driving the carriers, a series of foot members attached to each carrier so as to be operated thereby in generally horizontal orbits, straight, elongated gliding parts to ride onto and from the foot members when they are in road engaging position, and means for rasing and lowering the foot members progressively at the ends of said parts while traversing their orbits.

8. Propelling means for a vehicle, comprising, in combination, rotary carriers, means for driving the carriers, a series of foot members operatively connected to the carriers to be orbitally driven thereby in generally horizontal circuits, means for raising and lowering the foot members from and to road engaging position, fixed, straight stretch means on the vehicle to glide onto and from the foot members while they are in road engaging position, and means for effecting the application of the foot members to the roadway in curved lines, whereby to turn the vehicle.

9. Propelling means for a wheel-less vehicle, comprising, in combination, horizontal endless belts, a series of foot members attached to each belt to carry the whole load and be shifted by its belt in a generally horizontal-plane circuit including a straightway carrying stretch, means for carrying the foot members in an elevated, ineffective position to and from the carrying stretch and raising them at the ends thereof, and load imposing sole means at the said carrying stretch to bear upon the lowered members while these are in load carrying position.

FRANK GEORGE BENNETT.